United States Patent
Ma et al.

(10) Patent No.: US 10,721,681 B2
(45) Date of Patent: *Jul. 21, 2020

(54) SYSTEM AND METHOD FOR DYNAMICALLY CONFIGURABLE AIR INTERFACES

(71) Applicant: Huawei Technologies Co., Ltd., Shenzhen (CN)

(72) Inventors: Jianglei Ma, Ottawa (CA); Peiying Zhu, Kanata (CA); Ming Jia, Ottawa (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,941

(22) Filed: Aug. 6, 2018

(65) Prior Publication Data

US 2018/0352504 A1 Dec. 6, 2018

Related U.S. Application Data

(63) Continuation of application No. 15/960,374, filed on Apr. 23, 2018, which is a continuation of application No. 13/669,371, filed on Nov. 5, 2012.

(60) Provisional application No. 61/669,997, filed on Jul. 10, 2012.

(51) Int. Cl.
| | |
|---|---|
| *H04W 48/18* | (2009.01) |
| *H04L 1/18* | (2006.01) |
| *H04L 1/00* | (2006.01) |
| *H04W 88/06* | (2009.01) |

(52) U.S. Cl.
CPC .......... *H04W 48/18* (2013.01); *H04L 1/0001* (2013.01); *H04L 1/1825* (2013.01); *H04W 88/06* (2013.01)

(58) Field of Classification Search
CPC ..... H04L 1/0006; H04L 1/0026; H04W 88/06
See application file for complete search history.

(56) References Cited

U.S. PATENT DOCUMENTS

| | | |
|---|---|---|
| 5,412,375 A | 5/1995 | Wood |
| 5,909,460 A | 6/1999 | Dent |
| 6,985,437 B1 | 1/2006 | Vogel |
| 8,347,186 B1 | 1/2013 | Arikan |

(Continued)

FOREIGN PATENT DOCUMENTS

| | | |
|---|---|---|
| CN | 1316834 A | 10/2001 |
| CN | 101232658 A | 7/2008 |

(Continued)

OTHER PUBLICATIONS

Gessner, C., et al., "UMTS Long Term Evolution (LTE)" Technology Introduction Application Note, Rohde & Schwarz LTE Technology Introduction, Jul. 2012, 115 pages.

(Continued)

*Primary Examiner* — Kevin C. Harper
(74) *Attorney, Agent, or Firm* — Slater Matsil, LLP

(57) ABSTRACT

A method of transmitting includes categorizing a transmission between the first device and a second device as one of a plurality of transmission types, and selecting an air interface from a plurality of air interface candidates in accordance with the transmission as categorized. The method also includes sending the transmission to the second device using the selected air interface.

30 Claims, 9 Drawing Sheets

(56) References Cited

U.S. PATENT DOCUMENTS

| | | |
|---|---|---|
| 2001/0029191 A1 | 10/2001 | Wilhelm |
| 2002/0136276 A1 | 9/2002 | Franceschini et al. |
| 2003/0174760 A1 | 9/2003 | Rick et al. |
| 2003/0214928 A1 | 11/2003 | Chuah |
| 2004/0057420 A1 | 3/2004 | Curcio et al. |
| 2004/0106412 A1 | 6/2004 | Laroia et al. |
| 2004/0116153 A1 | 6/2004 | Kaminski et al. |
| 2004/0185785 A1 | 9/2004 | Mir et al. |
| 2004/0240527 A1 | 12/2004 | Giannakis et al. |
| 2005/0021619 A1 | 1/2005 | Gomes de Oliveira |
| 2005/0030911 A1* | 2/2005 | Tiedemann, Jr. ...... H04B 7/264 370/278 |
| 2005/0036481 A1 | 2/2005 | Chayat et al. |
| 2007/0160071 A1 | 7/2007 | Overtoom et al. |
| 2007/0189235 A1 | 8/2007 | Chandra et al. |
| 2007/0255797 A1 | 11/2007 | Dunn et al. |
| 2008/0080553 A1 | 4/2008 | Hasty et al. |
| 2008/0176518 A1 | 7/2008 | Pascht et al. |
| 2008/0205529 A1 | 8/2008 | Hannuksela et al. |
| 2008/0225788 A1 | 9/2008 | Inoue et al. |
| 2009/0122771 A1 | 5/2009 | Cai |
| 2009/0323608 A1 | 12/2009 | Adachi et al. |
| 2010/0009676 A1 | 1/2010 | Cormier et al. |
| 2010/0015919 A1 | 1/2010 | Tian |
| 2010/0046463 A1 | 2/2010 | Green |
| 2010/0067591 A1* | 3/2010 | Luo ....................... H04L 1/0025 375/260 |
| 2010/0105378 A1 | 4/2010 | Shi et al. |
| 2010/0118806 A1 | 5/2010 | Griot et al. |
| 2010/0128695 A1* | 5/2010 | Nagaraja ............... H04W 76/14 370/331 |
| 2010/0130195 A1 | 5/2010 | Rohaly et al. |
| 2010/0198304 A1 | 8/2010 | Wang |
| 2011/0090841 A1 | 4/2011 | Shyy et al. |
| 2011/0235604 A1 | 9/2011 | Inoue et al. |
| 2011/0237205 A1 | 9/2011 | Nieto et al. |
| 2013/0142136 A1 | 6/2013 | Pi et al. |
| 2014/0078973 A1 | 3/2014 | Kazmi et al. |
| 2014/0133378 A1 | 5/2014 | Wentink |
| 2016/0191218 A1 | 6/2016 | Bala et al. |

FOREIGN PATENT DOCUMENTS

| | | |
|---|---|---|
| EP | 1633104 A1 | 3/2006 |
| EP | 1826992 A2 | 8/2007 |
| EP | 2141853 A2 | 1/2010 |
| WO | 2010061825 A1 | 6/2010 |

OTHER PUBLICATIONS

"Long Term Evolution (LTE): Overview of LTE Air-Interface Technical White Paper," Technical White Paper, Motorola, Inc., 2007, pp. 1-8.

Salih, S. H. O., et al., "Implementation of Adaptive Modulation and Coding Technique using," International Journal of Scientific & Engineering Research, vol. 2, Issue 5, May 2011, pp. 1-4.

\* cited by examiner

SYSTEM AND METHOD FOR DYNAMICALLY CONFIGURABLE AIR INTERFACES

This patent application is a continuation of U.S. Non-Provisional application Ser. No. 15/960,374, filed on Apr. 23, 2018, entitled "System and Method for Dynamically Configurable Air Interfaces," which is a continuation of U.S. Non-Provisional application Ser. No. 13/669,371, filed on Nov. 5, 2012, entitled "System and Method for Dynamically Configurable Air Interfaces," which claims the benefit of U.S. Provisional Application No. 61/669,997, filed on Jul. 10, 2012, entitled "System and Method for Dynamic Software-Configured Air Interface", all of which applications are hereby incorporated herein by reference as if reproduced in their entireties.

TECHNICAL FIELD

The present disclosure relates generally to digital communications, and more particularly to a system and method for dynamically configurable air interfaces.

BACKGROUND

An air interface is the wireless communications link between two or more communicating devices, such as an evolved NodeB (also commonly referred to as a NodeB, a base station, a transmit point, a remote radio head, a communications controller, a controller, and the like) and a user equipment (UE) (also commonly referred to as a mobile station, a subscriber, a user, a terminal, a phone, and the like). Typically, both communicating devices need to know the air interface in order to successfully transmit and receive a transmission.

SUMMARY OF THE DISCLOSURE

Example embodiments of the present disclosure which provide a system and method for dynamically configurable air interfaces.

In accordance with an example embodiment of the present disclosure, a method for transmitting is provided. The method includes categorizing, by a first device, a transmission between the first device and a second device as one of a plurality of transmission types, and selecting, by the first device, an air interface from a plurality of air interface candidates in accordance with the transmission as categorized. The method also includes sending, by the first device, the transmission to the second device using the selected air interface.

In accordance with another example embodiment of the present disclosure, a method of receiving is provided. The method receiving, by a receiving device, information about a selected air interface for a transmission from a source device to a destination device, wherein the selected air interface is selected in accordance with input parameters of the transmission. The method also includes receiving, by the receiving device, the transmission from the source device using the selected air interface.

In accordance with another example embodiment of the present disclosure, a first device is provided. The first device includes a processor, and a transmitter operatively coupled to the processor. The processor categorizes a transmission from the first device to a second device as one of a plurality of transmission types, and selects an air interface from a plurality of air interface candidates in accordance with the transmission as categorized. The transmitter sends the transmission to the second device using the selected air interface.

One advantage of an embodiment is that the air interface may be dynamically configured to meet the requirements of a transmission between two or more communicating devices. Therefore, the communications performance may be optimized to meet the requirements of the transmission, thereby improving overall communications system performance.

A further advantage of an embodiment is that the granularity of the dynamic configuration of the air interface can be varied to meet performance requirements as well as computational resource availability. Therefore, the dynamic configuration of the air interface may be set according to available computational resources.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

With respect to an air interface adaptation signaling mechanism, a user equipment (UE) informs the network of its capability during the initial access. For UE grouping based UE assisted receiving, network and UE can exchange information on the formation of virtual Rx. Once the network determines the best scheme for each block, it communicates the selection results with the UEs. Generally, there are two types of signaling: explicit and implicit. High layer signaling can be used for explicit signaling, such as waveform (WF) selection and cyclic prefix (CP) selection. Implicit signaling can be used for fixed mapping relation between the selected scheme of each building block, and for the combination of the service type and the transmitting/receiving condition, such as time transmission interval (TTI) selection, re-transmission scheme selection, coding/modulation scheme selection and multiple access scheme selection. Explicit signaling can be used to override the implicit signaling.

One embodiment of the disclosure relates to dynamically configurable air interfaces. For example, at a transmission sending device, the transmission sending device categorizes a transmission as one of a plurality of transmission types having an input parameter. The transmission sending device selects an air interface from a plurality of air interface candidates according to the categorized transmission. The transmission sending device sends the transmission to the transmission receiving device using the selected air interface. As another example, at a transmission receiving device, the transmission receiving device receives information about a selected air interface for a transmission from a transmission sending device and receives a transmission from the transmission sending device using the selected air interface.

The present disclosure will be described with respect to example embodiments in a specific context, namely a heterogeneous communications system with different transmission source types and/or different transmission destination types. The different transmission source types may have different transmission capabilities, while the different transmission destination types may have different reception capabilities.

Figure 1:
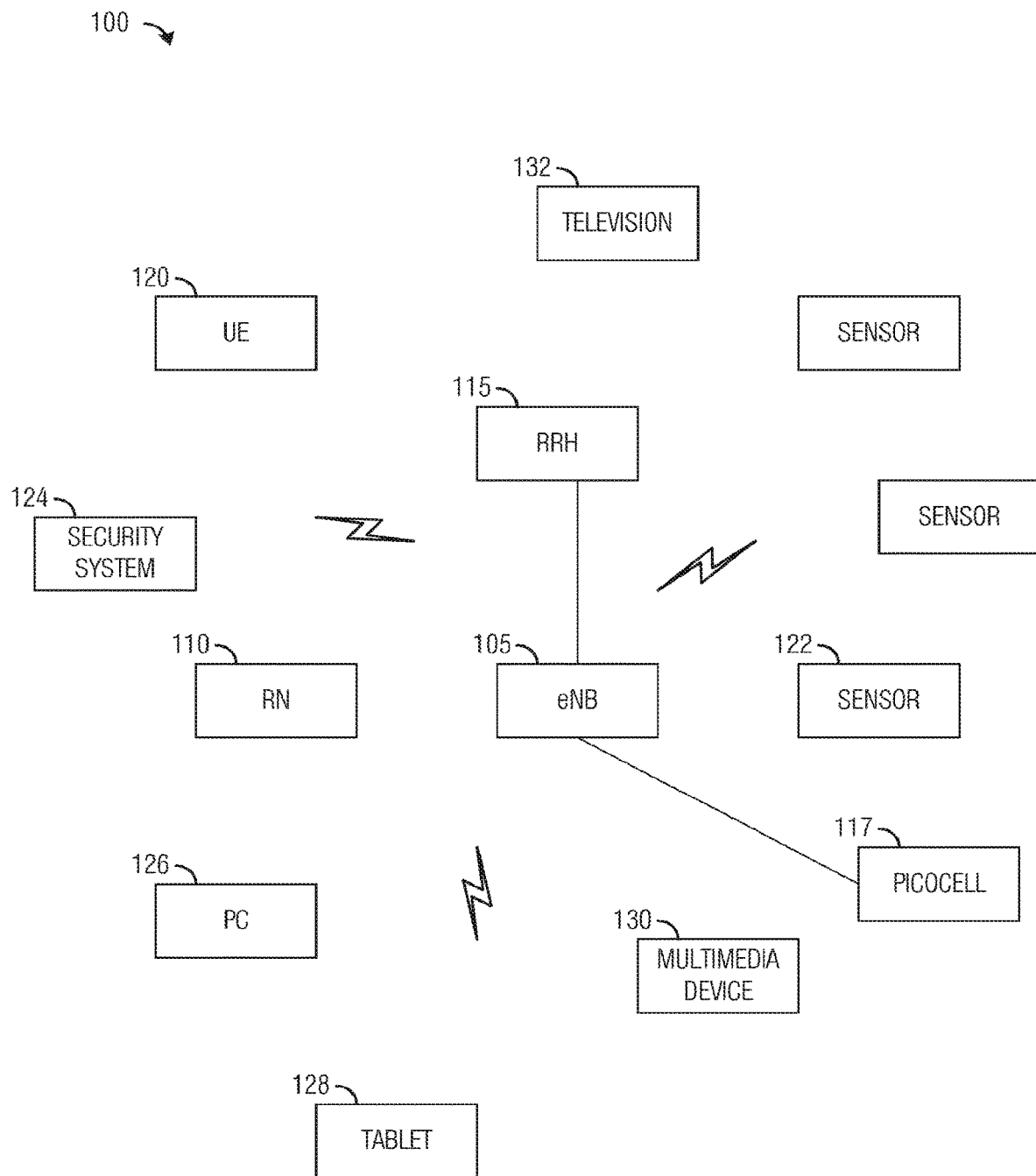
FIG. 1 illustrates an example heterogeneous communications system according to example embodiments described herein.

FIG. 1 illustrates a heterogeneous communications system 100. A heterogeneous communications system 100 may include a plurality of transmission sending devices, such as an evolved NodeB (eNB) 105, a relay node (RN) 110, a remote radio head (RRH) 115. Other examples of transmission sending devices include network transmit points located in picocells (e.g., picocell 117), femtocells, low-power cells, full-power cells, and the like. It is noted that many transmission sending devices, especially network side transmission sending devices, may be coupled together via a backhaul, which may be wired or wireless. As an example, eNB 105 may be connected to RRH 115 and picocell 117 via backhauls. Heterogeneous communications system 100 may include a plurality of transmission receiving devices, such as a user equipment (UE) 120, a sensor 122, a security system 124, a personal computer (PC) 126, a tablet computer 128, a multimedia device 130, a television 132, and the like. A transmitting-receiving device may be used to refer to a transmission sending device and/or a transmission receiving device. It is noted that a single device may be both a transmission sending device and a transmission receiving devices at different times, in different configurations, and/or with different communications partners. A communications controller may be a device configured to regulate the communications occurring in communications system 100. Examples of communications controllers include eNBs, a switch coupled to and controlling the eNBs, as well as other controlling entities in communications system 100.

The different transmission sending devices may have different transmission capabilities and/or requirements. As an example, an eNB may have multiple transmit antenna, while a picocell may not have multiple transmit antenna or a relatively small number of transmit antennas. Additionally, a picocells may transmit at a lower maximum power level comparable to that of an eNB. Similarly, a PC may have much higher data bandwidth requirements and signal processing capability than a sensor, and a security system may have much stricter reliable message reception requirements than a television. Therefore, in a heterogeneous communications system, such as heterogeneous communications system 100, different pairs of communicating devices (i.e., a transmission sending device and a transmission receiving device) may have different transmission capabilities and/or transmission requirements. The different transmission capabilities and/or transmission requirements typically cannot be met optimally by a single air interface or air interface configuration.

While it is understood that communications systems may employ multiple transmission sending devices capable of communicating with a number of transmission receiving devices, only a small number of transmission sending devices and transmission receiving devices are illustrated for simplicity.

Figure 2:
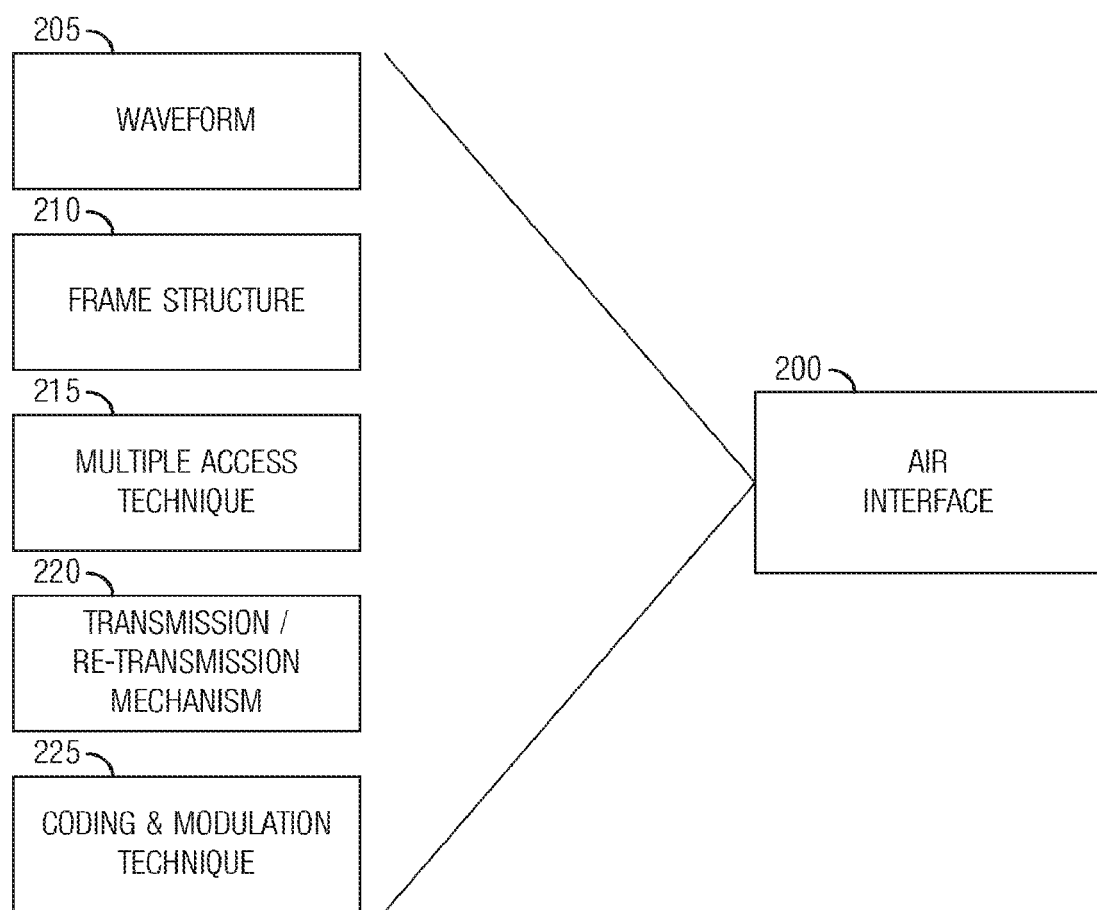
FIG. 2 illustrates an example air interface according to example embodiments described herein.

FIG. 2 illustrates a diagram of an air interface 200. Air interface 200 comprises a number of building blocks that collectively specify how a transmission is to be made and received. The building blocks of air interface 200 may include waveform 205, frame structure 210, multiple access technique 215, a transmission and/or re-transmission mechanism 220, and a coding and modulation technique 225. Waveform 205 may specify a shape and form of a signal being transmitted. Examples of waveform options include Low Density Signature Multicarrier Code Division Multiple Access (LDS-MC-CDMA), Wavelet Packet Modulation (WPM), Faster Than Nyquist (FTN) Waveform, low Peak to Average Ratio Waveform (low PAPR WF), Filter Bank Multicarrier (FBMC) Waveform, and the like. Frame structure 210 may specify a configuration of a frame or group of frames. Examples of frame structure options include a configurable multi-level transmission time interval (TTI), a fixed TTI, a configurable single-level TTI, a co-existence configuration, and the like.

Multiple access technique 215 may specify how access to a channel is granted for one or more users. Examples of multiple access technique options include dedicated channel resource (no sharing between multiple users), contention based shared channel resource, non-contention based shared channel resource, cognitive radio based access, and the like. A transmission and/or re-transmission mechanism may specify how a transmission and/or a re-transmission are to be made. Possible transmission and/or re-transmission mechanism options include those that specify a scheduled data pipe size, a signaling mechanism for transmission and/or re-transmission, a re-transmission mechanism, and the like. Coding and modulation technique 225 may specify how information being transmitted may be encoded (decoded) and modulated (demodulated) for transmission (reception) purposes. Examples of coding and/or modulation technique options include turbo trellis codes, turbo product codes, fountain codes, hierarchical modulation, low PAPR modulation, polar codes, and the like.

Since an air interface comprises a plurality of building blocks, and each building block may have a plurality of candidate selections, it may be possible to configure a large number of different air interface candidates. Each of the different air interface candidates may be targeted to meet a different set of transmission requirements, including transmission content, transmit condition, receive condition, and the like. In general, the transmission requirements specify the transmission. Then, according to transmission requirements of a pair of communicating transmitting-receiving devices (i.e., the transmission requirements for the transmission), one of the different air interface candidates that best meet the transmission requirements (and hence the transmission) may be selected and used for communications between the pair of communicating transmitting-receiving devices.

It is noted that although the discussion focuses on selecting an air interface for a pair of communicating transmitting-receiving devices (or simply, communicating device pair), the example embodiments discussed herein may be operable for more than two communicating transmitting-receiving devices. As an example, a single transmission sending device may transmit to a plurality of transmission receiving devices, where the transmission may be considered to be a single transmission. As another example, a plurality of transmission sending devices may transmit to a single transmission receiving device, where the transmission may be considered to be a single transmission. As yet another example, a plurality of transmission sending devices may transmit to a plurality of transmission receiving devices, where the transmission may be considered to be a single transmission. It may be possible to select an air interface for each single transmission. It may be possible to decompose the single transmission into multiple transmissions between each pair of communicating transmitting-receiving devices and select an air interface for each of the multiple transmissions. Therefore, the discussion of a pair of communicating transmitting-receiving devices should not be construed as being limiting to either the scope or the spirit of the example embodiments.

Figure 3:
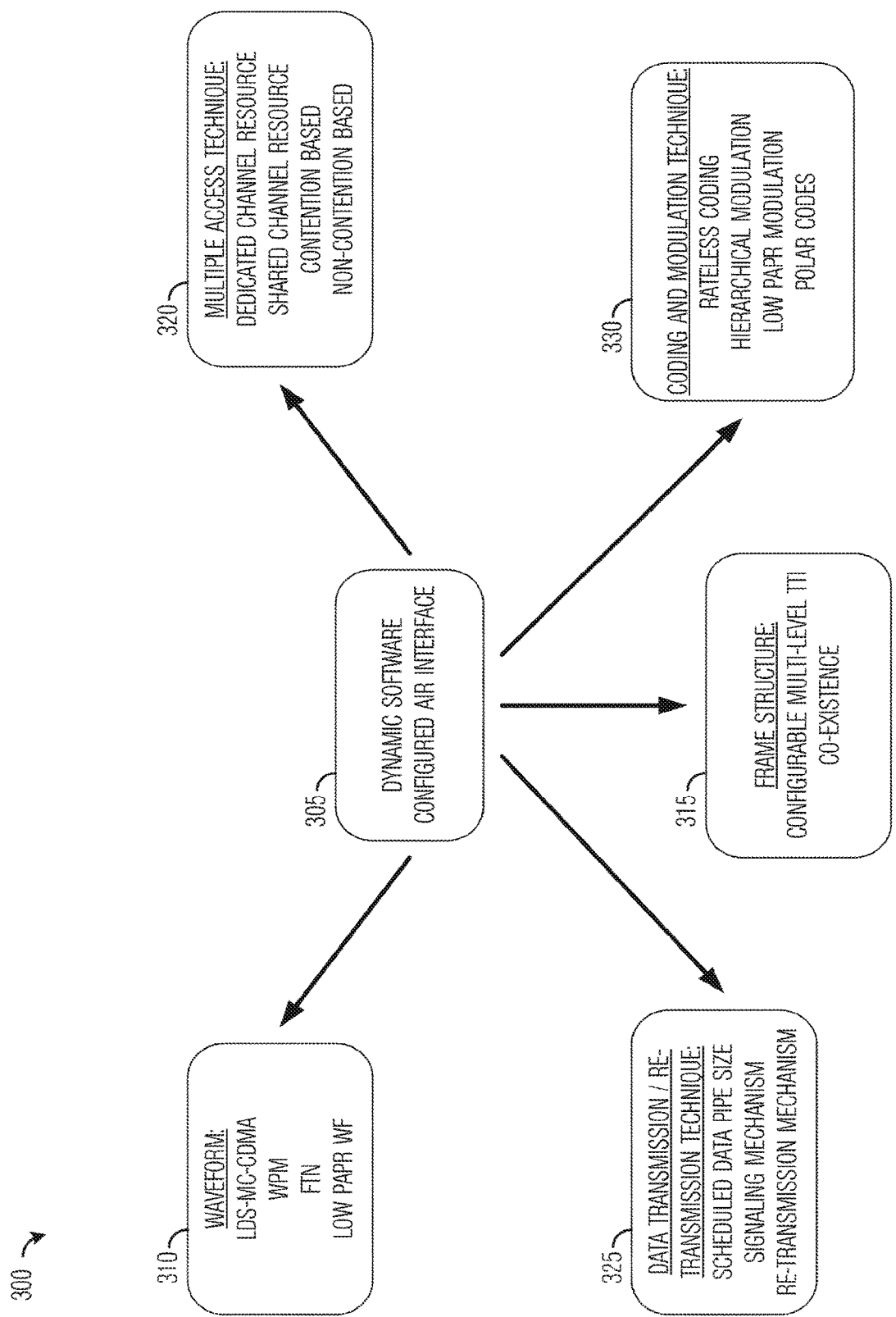
FIG. 3 illustrates a high level view of an example air interface configured to meet transmission requirements according to example embodiments described herein.

FIG. 3 illustrates a high level view of an air interface 300 configured to meet transmission requirements. Air interface 300 may include building blocks, such as a waveform 310, a frame structure 315, a multiple access technique 320, a data transmission and/or re-transmission technique 325, and a coding and modulation technique 330. Each building block of air interface 300 may have an option selected out of a plurality of possible options that is selected to meet the transmission requirements, including transmission type, transmit condition, receive condition, and the like. As an illustrative example, for waveform 310, possible options include LDS-MC-CDMA, WPM, FTN, FBMC, low PAPR WF, and the like. One of the possible options is selected to meet the transmission requirements. As another illustrative example, for coding and modulation technique 330, possible options include fountain codes, hierarchical modulation, low PAPR modulation, polar codes, and the like. Suitable options are selected to meet the transmission requirements.

Figure 4:
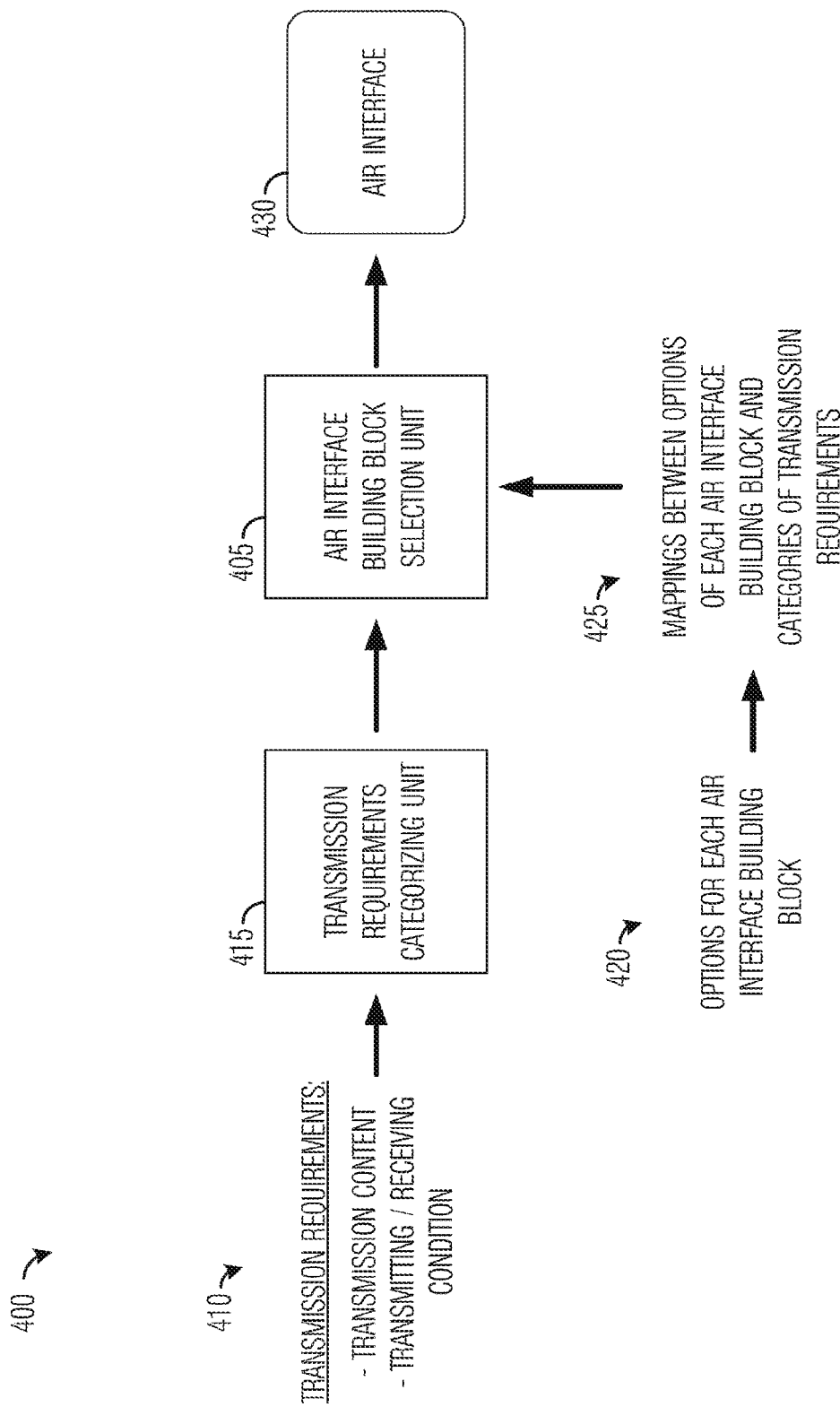
FIG. 4 illustrates a high level view of an example device for selecting an air interface to meet transmission requirements for a communicating device pair according to example embodiments described herein.

FIG. 4 illustrates a high level view of a device 400 for selecting an air interface to meet transmission requirements for a communicating device pair. As an example, device 400 may be an entity in a communications system configured to select an air interface for the communications device pair. As another example, device 400 may be a combination of more than one devices configured to select an air interface for the communications device pair. As another example, device 400 may be one of the communicating devices in the communicating device pair, such as the transmission source device. As another example, device 400 may be a centralized entity configured to select an air interface for the communications device pairs in the communications system. As another example, device 400 may be a centralized entity configured to select an air interface for the communications device pairs in a portion of the communications system.

Device 400 may include an air interface building block selection unit (AIBBSU) 405 that may be used to select an option for each of the building blocks of an air interface out of a plurality of possible options available for selection for each building block. AIBBSU 405 may select the options for the building blocks in accordance with transmission requirements 410. In other words, AIBBSU 405 may select an air interface out of a plurality of candidate air interfaces in accordance with transmission requirements 410. Transmission requirements 410 may include transmission type (i.e., transmission content), such as voice, video, music, data, sensor data, telemetry data, multimedia, gaming data, and the like, which may correspond to low delay sensitivity transmission, medium delay sensitivity transmission, high delay sensitivity transmission, low error tolerance transmission, medium error tolerance transmission, high error tolerance transmission, small packet transmission, large packet transmission, and the like.

Transmission requirements 410 may also include additional requirements, such as data rate, tolerable error rate, real-time restrictions, quality of service requirements, and the like. Transmission requirements 410 may also include transmit condition, which may be information regarding a device operating as the transmitter in the communicating device pair. Examples of transmit condition may include: number of transmit antenna, available transmission resources, available computational resources, channel condition at the transmitter, and the like. Additional examples of transmit condition may include: low PAPR tolerance, high PAPR tolerance, low processing power receiver, high processing power receiver, low delay spread, high delay spread, and the like. Transmission requirements 410 may also include receive condition, which may be information regarding a device operating as the receiver in the communicating device pair. Examples of receive condition may include: number of receive antenna, available computational resources, channel condition at the receiver, UE assisted receiving, non-UE assisted receiving, and the like.

Transmission requirements 410 may be categorized in a transmission requirements categorizing unit 415 to produce a categorized version of transmission requirements 410. Since transmission requirements 410 may span a wide range of possible values, transmission requirements categorizing unit 415 may reduce the complexity associated with such a wide range of possible values by characterizing transmission requirements 410. As an illustrative example, consider a situation wherein transmission requirements 410 comprise a medium delay sensitivity transmission with less than 100 ms delay bound. Transmission requirements categorizing unit 415 may simplify transmission requirements 410 by placing it into a category of medium delay sensitivity transmission with delay bound between 20 ms to 100 ms. In other words, transmission requirements categorizing unit 415 places transmission requirements 410 of a transmission into a category to simplify the selection of the options for each of the plurality of building blocks of an air interface use to transmit the transmission.

Device 400 may also make use of options for each of the plurality of building blocks (or simply options) 420. Options 420 may be determined a priori and stored in a memory accessible by AIBBSU 405. Options 420 may be determined so that air interfaces arising from the selection of subsets of options 420 may meet performance criteria for a range of expected values of transmission requirements 410. As an illustrative example, a first subset of options 420 (which may be referred to as a first candidate air interface) may result in an air interface that meets performance criteria for transmission requirements 410 specifying a medium delay sensitivity transmission with a delay bound in the range of 50 ms to 100 ms, while a second subset of options 420 (which may be referred to as a second candidate air interface) may result in an air interface that meets performance criteria for transmission requirements 410 specifying a small packet transmission at 5 kbps with a very low failure rate, and a third subset of options 420 (which may be referred to as a third candidate air interface) may result in an air interface that meets performance criteria for transmission requirements 410 specifying a large packet transmission at 2 Mbps but can tolerate a large latency. Alternatively, an external entity, such as a network entity, an operator of the communications system, a technical standard, and the like, may determine options 420.

Device 400 may also make use of a mapping 425 between options 420 and possible categories of transmission requirements 410. Mapping 425 may specify which subset of options 420, when selected for the building blocks of an air interface, will meet a category transmission requirements 410. AIBBSU 405 may determine mapping 425. Mapping 425 may be stored in a memory for subsequent use. Mapping 425 may be stored in a table format, such as a look-up table, that is indexed by the categorized transmission requirements 410. In other words, AIBBSU 405 may make selections of plurality of options 420 for each of the plurality of building blocks to meet the different categories of transmission requirements 410. As an example, AIBBSU 405 may make selections of plurality of options 420 to produce an air interface that meets performance requirements for a category of medium delay sensitivity transmission. Alternatively, an external entity, such as a network entity, an operator of the communications system, a technical standard, and the like, may determine mapping 425 between plurality of options 420 and the categorized version of transmission requirements 410.

Table 1 illustrates an example mapping of categories of transmission requirements 410 to options 420, wherein transmission requirements 410 comprises transmission content (e.g., transmission type). Table 2 illustrates an example mapping of categories of transmission requirements 410 to options 420, wherein transmission requirements 410 comprise transmit and/or receive condition. It is noted that blank entries in either Table 1 or Table 2 indicate that any option or a default option may be used for the corresponding building block.

TABLE 1

Mapping of transmission content to building block options.

| Category | Waveform selection | Frame structure selection | Transmission technique selection | Re-transmission technique selection | Coding & Modulating technique selection |
|---|---|---|---|---|---|
| Low delay sensitivity | | Long TTI | | ARQ only | Aggressive coding/modulating |
| Medium delay sensitivity | | Medium TTI | | ARQ plus HARQ | Rateless |
| High delay sensitivity | | Short TTI | | HARQ only | Rateless |
| Low error tolerance | Orthogonal WF | | | ARQ plus HARQ | Rateless |
| Medium error tolerance | Orthogonal WF | | | HARQ only | Rateless |
| High error tolerance | Non-orthogonal WF | | | No re-transmission | Aggressive coding/modulating |
| Small packet | | | Grant-free transmission | | |
| Large packet | | | Grant-based transmission | | Rateless |

TABLE 2

Mapping of transmitting condition to building block options.

| Category | Waveform selection | Frame structure selection | Transmission technique selection | Re-transmission technique selection | Coding & Modulating technique selection |
|---|---|---|---|---|---|
| Low PAPR tolerance | Low PAPR WF | | | | |
| High PAPR tolerance | High PAPR WF | | | | |

TABLE 2-continued

Mapping of transmitting condition to building block options.

| Category | Waveform selection | Frame structure selection | Transmission technique selection | Re-transmission technique selection | Coding & Modulating technique selection |
|---|---|---|---|---|---|
| Low processing power receiver | Orthogonal WF | | | | |
| High processing power receiver | Non-Orthogonal WF | | | | |
| Low delay spread | | Short CP | | | |
| High delay spread | | Long CP | | | |
| UE assisted receiving | | | | ARQ only | Hierarchical modulation; Fountain code; Aggressive coding/modulating |
| Non-UE assisted receiving | | | | | Non-hierarchical modulation |

Output of transmission requirements categorizing unit 415 (categorized version of transmission requirements 410) and mapping 425 may be provided to AIBBSU 405, which may select options for each of the building blocks of an air interface in accordance with the categorized version of transmission requirements 410. The selected options for each of the building blocks of combine to specify an air interface to be used to transmit a transmission(s) that meet transmission requirements 410. As an illustrative example, if the categorized version of transmission requirements 410 of a transmission is "Low delay sensitivity", AIBBSU 405 may refer to mapping 425 (an example of which is shown in Table 1) and select long TTI for the frame structure building block, ARQ only for the re-transmission technique building block, and aggressive coding/modulating for the coding & modulating technique building block of an air interface intended to transmit the transmission. Other building blocks of the air interface may be set to default options. As another illustrative example, if the categorized version of transmission requirements 410 of a transmission is "UE assisted receiving", AIBBSU 405 may refer to mapping 425 (an example of which is shown in Table 2) and select ARQ only for the re-transmission technique building block, and hierarchical modulation for the coding & modulating technique building block of an air interface intended to transmit the transmission. Other building blocks of the air interface may be set to default options.

It is noted that the discussion of FIG. 4 highlights a technique wherein AIBBSU 405 selects options for each building block of an air interface all at the same time according to the categorized transmission requirements 410. This is analogous to selecting a candidate air interface out of the plurality of candidate air interfaces. However, it may be possible for AIBBSU 405 to select an option for each building block of an air interface one building block at a time and have a previously selected option for a building block potentially impacting the options available for selection in a later selected building block. In such a configuration, the selection of the options for the building blocks of the air interface may follow a tree-like structure.

Figure 5:
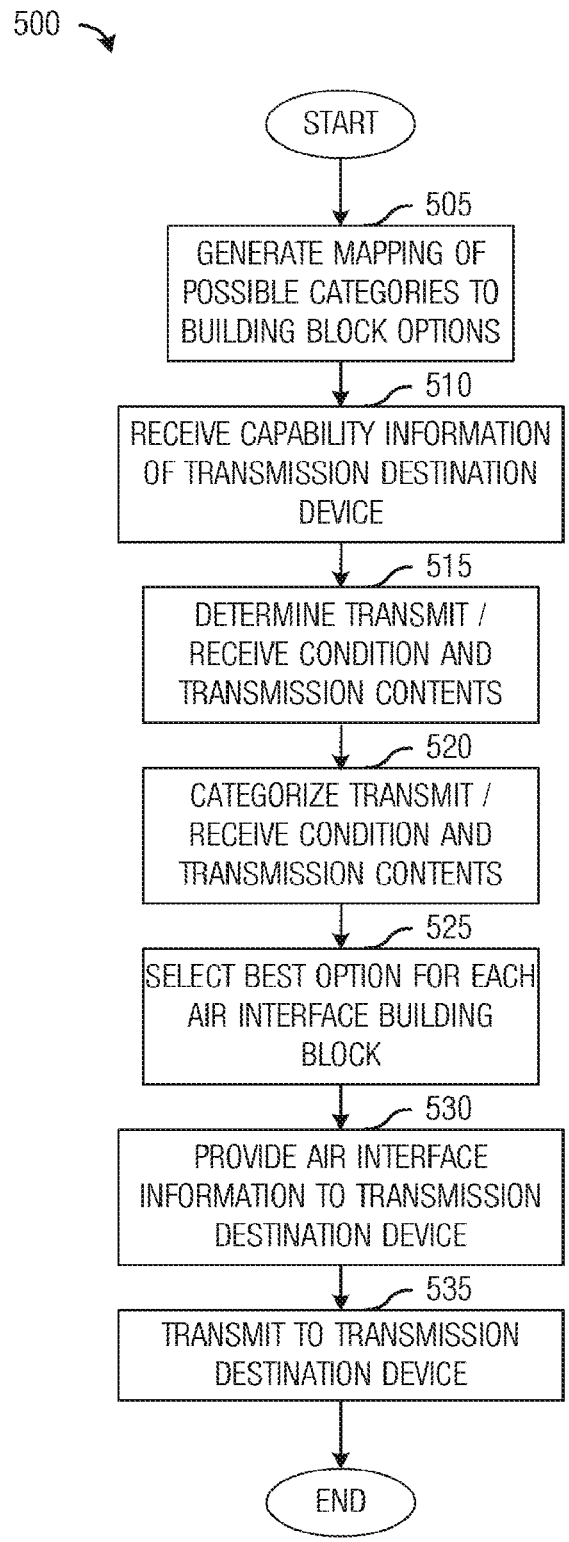
FIG. 5 illustrates a flow diagram of example operations in a device as the device selects an air interface for a transmission occurring in a communicating device pair, wherein the selecting of the air interface is in accordance with transmitting condition, receiving condition, and/or transmission content of the transmission according to example embodiments described herein.

FIG. 5 illustrates a flow diagram of operations 500 in a device as the device selects an air interface for a transmission occurring in a communicating device pair, wherein the selecting of the air interface is in accordance with transmit condition, receive condition, and/or transmission content of the transmission. Operations 500 may be indicative of operations occurring in a device, such as device 400, as the device selects an air interface for a communicating device pair. The device may be a transmission sending device or an entity in a communications system configured to select an air interface for a communicating device pair including the transmission receiving device.

Operations 500 may begin with the device generating (predefining) a mapping of possible categories of transmit condition, receive condition, and/or transmission content of the transmission to building block options (block 505). Examples of transmission requirements may include transmission content, transmit condition, receive condition, and the like. The mapping may provide an optimal air interface for each possible category of transmission requirement. The device may generate the mapping by selecting options of the building blocks to produce air interfaces that meet possible transmit condition, receive condition, and/or transmission content of the transmission. In other words, the device may configure a candidate air interface for each possible category of transmit condition, receive condition, and/or transmission content of the transmission. The generating of the mapping may be performed a priori and stored in a memory, for example, for subsequent use by the device.

Alternatively, the mapping may be generated by a different entity, such as a network entity, an operator of the communications system, a technical standard, and the like, and provided to the device. As an example, the mapping may be stored at a server. As another example, the mapping may be transmitted to the device. It is noted that the mapping may be updated periodically or upon an occurrence of an event. Examples of events may include the receipt of an instruction to update the mapping, a failure of one or more transmissions to meet their respective performance criteria, an error rate (such as frame error rate, bit error rate, block error rate, and the like) meeting a specified value, significant changes in network topology, significant changes in device numbers, significant change of traffic types, failures of one more devices (such as eNBs, picocells, RRHs, and the like), and the like. Updating the mapping may allow for changing operating conditions, network congestion, traffic patterns, and the like.

The device may receive capability information of the transmission receiving device (block 510). The capability of the transmission receiving device may play a role in the selection of the air interface. As an example, if the transmission receiving device is incapable of providing processing power to decode a transmission encoded using a relatively complex coding & modulating technique, the device may elect to not select an air interface that makes use of complex coding & modulating techniques.

The device may determine transmit condition, receive condition, and/or transmission content of the transmission between the transmission sending device and the transmission receiving device (block 515). The transmit condition, the receive condition, and the transmission content of the transmission may be categorized into one of a plurality of transmission types. The transmit condition, the receive condition, and the transmission content of the transmission (and therefore, the transmission itself) provide information about requirements of the transmission that the device needs to meet when the device selects an air interface for the transmission. If the device is the transmission sending device, the device knows the transmission content and the transmit condition and the transmission destination device may provide receive condition information to the device. If the device is not the transmission sending device, then the transmission sending device may provide transmission content and transmit condition to the device, and the transmission receiving device may provide receive condition to the device.

The device may categorize the transmit condition, the receive condition, and/or the transmission content of the transmission (block 520). The transmit condition, the receive condition, and/or the transmission content of the transmission may be categorized into one of a plurality of transmission types. Categorizing the transmit condition, the receive condition, and/or the transmission content (and hence the transmission) may reduce the wide range of possible values of the transmit condition, the receive condition, and/or the transmission content, thereby decreasing the complexity associated selecting options for each possible value. In other words, categorizing the transmit condition, the receive condition, and/or the transmission content reduces the search space for building block option selection.

The device may select best options for each building block of an air interface in accordance with the transmit condition, the receive condition, and/or the transmission content categories and the mapping of possible categories of transmit condition, receive condition, and/or transmission content of the transmission to building block options (block 525). The device may use the transmit condition, the receive condition, and/or the transmission content categories to select the options for each building block of the air interface. In other words, the device may select an air interface from a plurality of air interface candidates using the categorized transmission requirements. As an example, consider the mapping of possible categories of transmit condition, receive condition, and/or transmission content of the transmission to building block options arranged as shown in Table 1 or Table 2, the device may use the transmit condition, the receive condition, and/or the transmission content categories to search in Table 1 or Table 2 to select the building block options of the air interface.

The device may provide air interface information, e.g., the building block options to the transmission receiving device (block 530). The device may signal the air interface information to the transmission receiving device. The air interface information may be signaled to the transmission receiving device over a default air interface or a previously selected air interface. If the device is not the transmission sending device, then the device may also signal the air interface information to the transmission sending device. As an example, the device may signal indicators for each selected building block option to the transmission receiving device (and the transmission sending device). As an another example, if the mapping of possible categories of transmit condition, receive condition, and/or transmission content of the transmission to building block options is available at the transmission receiving device (and the transmission sending device) the device may signal an indicator of the transmit condition, the receive condition, and/or the transmission content categories used to select the building block options to the transmission receiving device (and the transmission sending device).

The transmission(s) made by the device may be an explicit transmission, utilizing a control channel dedicated for the transmission such information. The transmission(s) made by the device may be an implicit transmission, wherein the information may be embedded in a control channel intended for use in signaling other forms and types of information. The device may transmit the transmission to the transmission receiving device, if the device is the transmission sending device (block 535). The transmission may be transmitted using the air interface.

It is noted that categorizing the transmit condition, the receive condition, and/or the transmission content of the transmission (block 520), selecting best options for each building block of an air interface in accordance with the transmit condition, the receive condition, and/or the transmission content categories and the mapping of possible categories of transmit condition, receive condition, and/or transmission content of the transmission to building block options (block 525), and providing air interface information, e.g., the building block options to the transmission receiving device and/or the transmission sending device (block 530) may occur for each transmission to the transmission receiving device. Alternatively, blocks 520-530 may take place once every specified number of transmissions. Alternatively, blocks 520-530 may take place upon an occurrence of an event, such as an error rate, a received instruction, a change of transmission content, transmitting condition, and/or receiving condition, and the like. As an example, if the transmission sending device receives an instruction from the transmission receiving device (or some other entity in the communications system), the transmission sending device may perform blocks 520-530. Alternatively, blocks 520-530 may take place at specified intervals or time instances. Alternatively, blocks 520-530 may take place when the transmission receiving device changes location due to mobility and significantly changes its operating condition. The degree to which the operating condition for the transmission receiving device changes before blocks 520-530 are performed may be a predetermined or prespecified amount.

Figure 6:
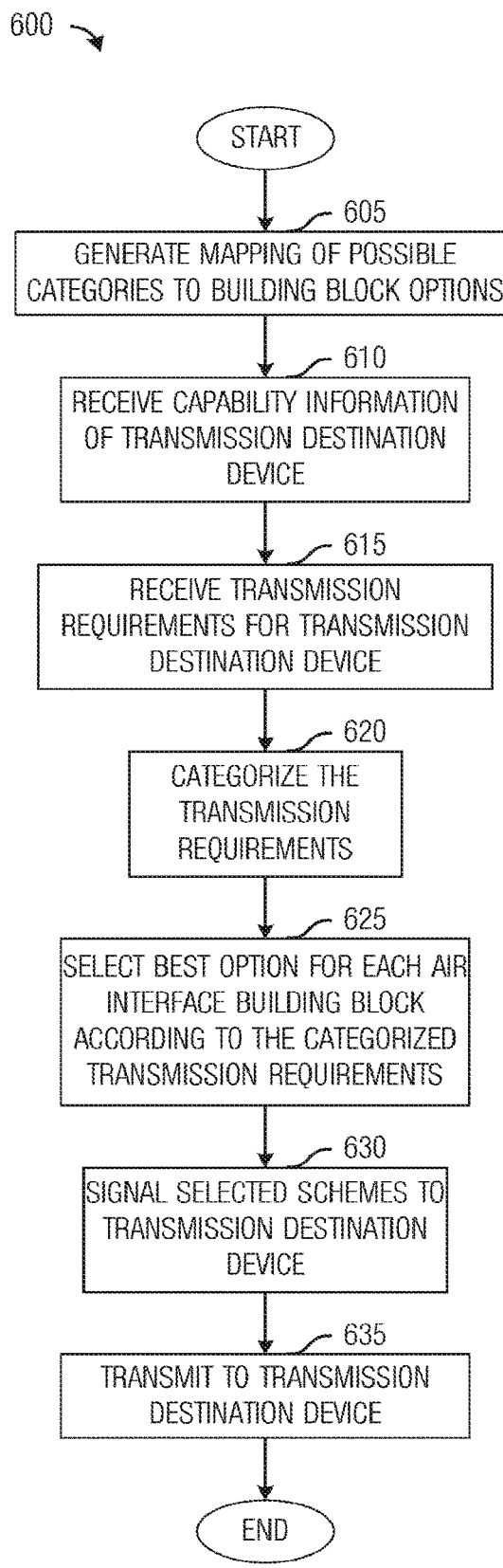
FIG. 6 illustrates a flow diagram of example operations in a device as the device selects an air interface for a transmission occurring in a communicating device pair, wherein the selecting of the air interface is in accordance with transmission requirements of the transmission according to example embodiments described herein.

FIG. 6 illustrates a flow diagram of operations 600 in a device as the device selects an air interface for a transmission occurring in a communicating device pair, wherein the selecting of the air interface is in accordance with transmission requirements of the transmission. Operations 600 may be indicative of operations occurring in a device, such as device 400, as the device selects an air interface for a communicating device pair. The device may be a transmission sending device or an entity in a communications system configured to select an air interface for a communicating device pair including the transmission receiving device.

Operations 600 may begin with the device generating (predefining) a mapping of possible categories of transmission requirements of the transmission to building block options (block 605). Examples of transmission requirements may include transmission content, transmit condition, receive condition, and the like. The mapping may provide an optimal air interface for each possible category of transmission requirement. The generating of the mapping may be performed a priori and stored, for example, in a memory, for subsequent use by the device.

Alternatively, the mapping may be generated by a network entity and provided to the device. As an example, the mapping may be stored at a server. As another example, the mapping may be transmitted to the device. It is noted that the mapping may be updated periodically or upon an occurrence of an event. Examples of events may include the receipt of an instruction to update the mapping, a failure of one or more transmissions to meet their respective performance criteria, an error rate (such as frame error rate, bit error rate, block error rate, and the like) meeting a specified value, significant changes in network topology, significant changes in device numbers, significant change of traffic types, failures of one more devices (such as eNBs, picocells, RRHs, and the like), and the like. Updating the mapping may allow for changing operating conditions, network congestion, traffic patterns, and the like.

The device may receive capability information of the transmission receiving device (block 610). The device may determine transmission requirements of the transmission (block 615). The transmission requirements of the transmission provide information about requirements of the transmission that the device needs to meet when the device selects an air interface for the transmission.

The device may categorize the transmission requirements of the transmission between the transmission sending device and the transmission receiving device (block 620). The transmission requirements of the transmission may be categorized into one of a plurality of transmission types. Categorizing the transmission requirements (and hence the transmission) may reduce the wide range of possible values of the transmission requirements, thereby decreasing the complexity associated selecting options for each possible value. In other words, categorizing the transmission requirements reduces the search space for building block option selection.

The device may select best options for each building block of an air interface in accordance with the transmission requirements and the mapping of possible categories of transmission requirements of the transmission to building block options (block 625). The device may use the transmission requirements categories to select the options for each building block of the air interface. In other words, the device may select an air interface from a plurality of air interface candidates using the categorized transmission requirements. As an example, consider the mapping of possible categories of transmission requirements of the transmission to building block options arranged as shown in Table 1 or Table 2, the device may use the transmission requirements categories to search in Table 1 or Table 2 to select the building block options of the air interface.

The device may provide air interface information, e.g., the building block options to the transmission receiving device (block 630). The device may signal the air interface information to the transmission receiving device. The air interface information may be signaled to the transmission receiving device over a default air interface or a previously selected air interface. If the device is not the transmission sending device, then the device may also signal the air interface information to the transmission sending device. As an example, the device may signal indicators for each selected building block option to the transmission receiving device (and the transmission sending device). As an another example, if the mapping of possible categories of transmit condition, receive condition, and/or transmission content of the transmission to building block options is available at the transmission receiving device (and the transmission sending device) the device may signal an indicator of the transmit condition, the receive condition, and/or the transmission content categories used to select the building block options to the transmission receiving device (and the transmission sending device).

The transmission(s) made by the device may be an explicit transmission, utilizing a control channel dedicated for the transmission such information. The transmission(s) made by the device may be an implicit transmission, wherein the information may be embedded in a control channel intended for use in signaling other forms and types of information. The device may transmit the transmission to the transmission receiving device (block 635). The transmission may be transmitted using the air interface.

Figure 7:
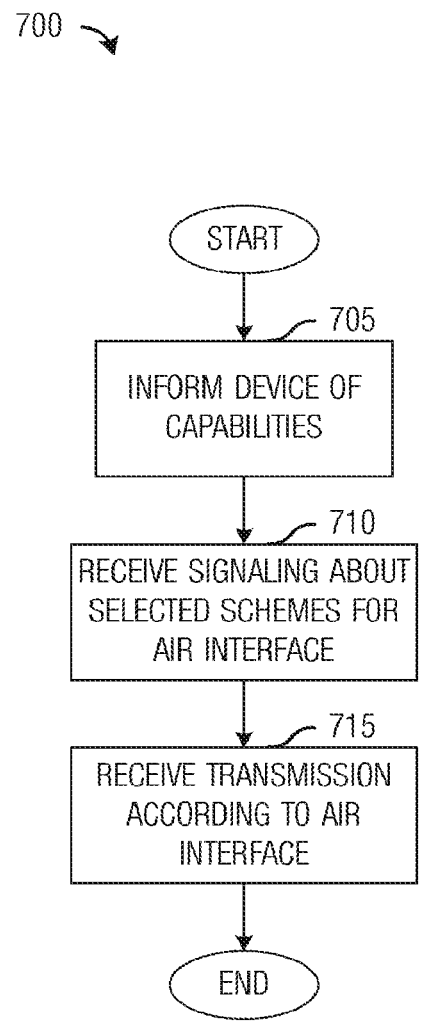
FIG. 7 illustrates a flow diagram of example operations in a transmission destination device as the transmission destination device receives a transmission over a dynamically configurable air interface according to example embodiments described herein.

FIG. 7 illustrates a flow diagram of operations 700 in a transmission receiving device as the transmission receiving device receives a transmission over a dynamically configurable air interface. Operations 700 may be indicative of operations occurring in a transmission receiving device, such as UE 120, network transmit point, sensor 122, and the like, as the transmission receiving device receives a transmission over a dynamically configurable air interface.

Operations 700 may begin with the transmission receiving device informing a transmission sending device (or an entity configured to select an air interface) its capabilities (block 705). The capability of the transmission receiving device may play a role in the selection of the air interface. The transmission receiving device may receive signaling about selected building block options of the air interface (block 710). The air interface may have been selected in accordance with the transmission (i.e., its transmission requirements). The signaling of the air interface may be in accordance with a default air interface or a previously used air interface. The signaling may be received in an explicit transmission, utilizing a control channel dedicated for the transmission such information. The signaling may be received in an implicit transmission, wherein the information may be embedded in a control channel intended for use in signaling other forms and types of information.

As an example, the transmission receiving device may receive indicators for each selected building block option. As an another example, if the mapping of possible categories of transmit condition, receive condition, and/or transmission content of the transmission to building block options is available at the transmission receiving device, the transmission receiving device may receive an indicator of the transmit condition, the receive condition, and/or the transmission content categories used to select the building block options. The transmission receiving device may receive, which may include detect and decode, a transmission from the transmission sending device, wherein the transmission is transmitted using the air interface (block 715).

Figure 8:
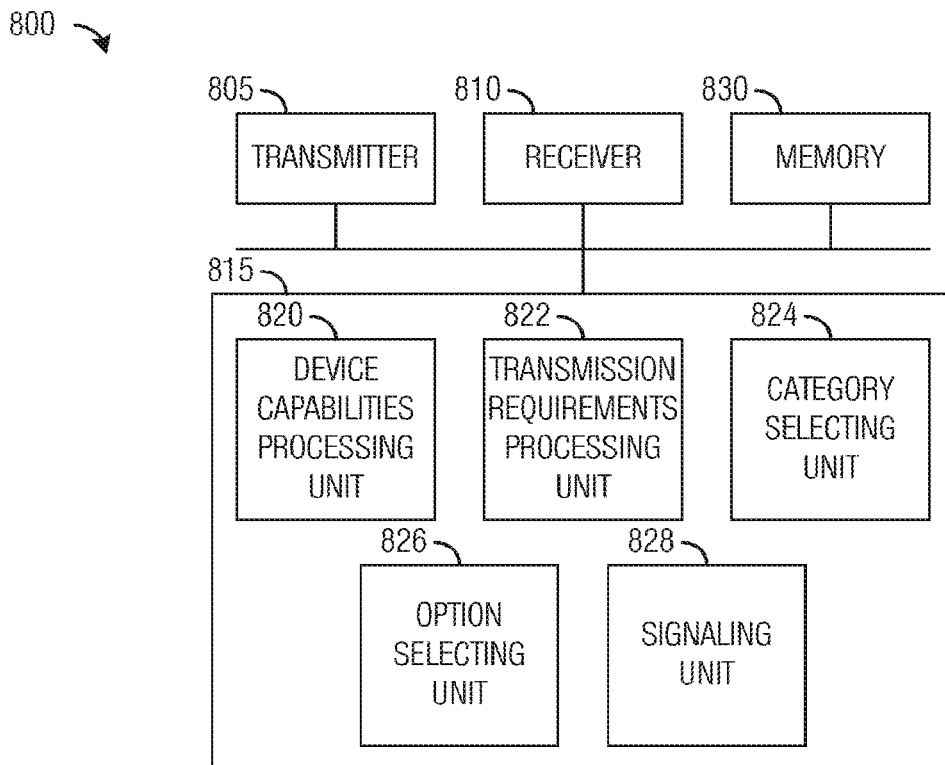
FIG. 8 illustrates a diagram of an example first communications device according to example embodiments described herein.

FIG. 8 illustrates a diagram of a first communications device 800. Communications device 800 may be an implementation of a transmission sending device or an entity configured to select air interface for communicating device pairs. Communications device 800 may be used to implement various ones of the embodiments discussed herein. As shown in FIG. 8, a transmitter 805 is configured to send messages, and the like, and a receiver 810 is configured to receive messages, and the like. Transmitter 805 and receiver 810 may have a wireless interface, a wireline interface, or a combination thereof.

A device capabilities processing unit 820 is configured to process information about capabilities of a transmission receiving device, which may be used in the selection of building block options of an air interface. An transmission parameters processing unit 822 is configured to process transmission requirements, including transmission content, transmit condition, receive condition, and the like, of a transmission from communications device 800. A category selecting unit 824 is configured to categorize (or characterize) transmission requirements. Category selecting unit 824 helps to reduce possible values of transmission requirements and simplifies configuring the air interface. An option selecting unit 826 is configured to select options of building blocks of an air interface according to the categorized transmission requirements. As an example, option selecting unit 826 utilizes a table, such as Table 1 or Table 2, to select options of building blocks of the air interface. A signaling unit 828 is configured to signal information about the air interface to the transmission receiving device or the entity configured to select air interfaces. A memory 830 is configured to store transmission requirements categories, building block options, selected options of building blocks, categorized transmission requirements, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while device capabilities processing unit 820, transmission requirements processing unit 822, category selecting unit 824, option selecting unit 826, and signaling unit 828 may be software modules executing in a processor 815, such as a microprocessor, a digital signal processor, a custom circuit, or a custom compiled logic array of a field programmable logic array. Device capabilities processing unit 820, transmission requirements processing unit 822, category selecting unit 824, option selecting unit 826, and signaling unit 828 may be modules stored in memory 830.

Figure 9:
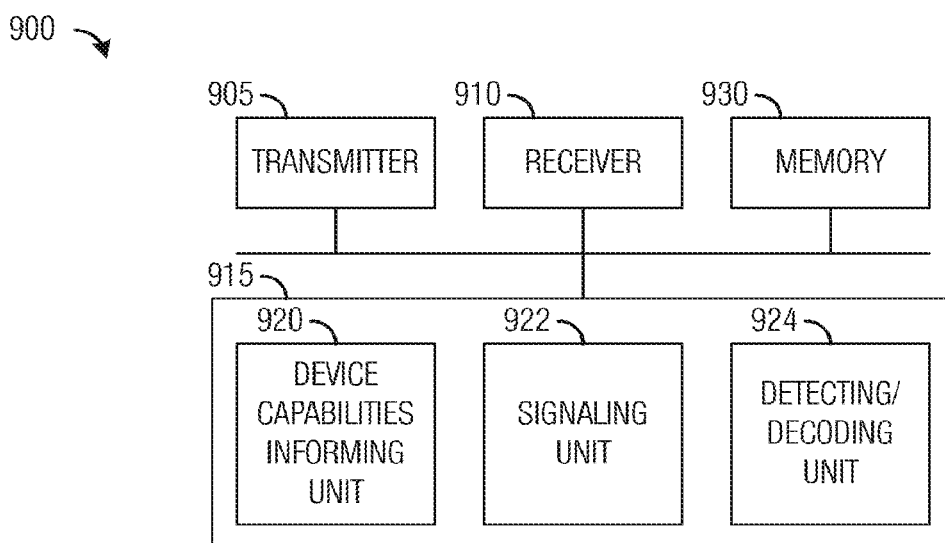
FIG. 9 illustrates a diagram of an example second communications device according to example embodiments described herein.

FIG. 9 illustrates a diagram of a second communications device 900. Communications device 900 may be an implementation of a transmission receiving device of a communicating device pair. Communications device 900 may be used to implement various ones of the embodiments discussed herein. As shown in FIG. 9, a transmitter 905 is configured to send messages, and the like, and a receiver 910 is configured to receive messages, and the like. Transmitter 905 and receiver 910 may have a wireless interface, a wireline interface, or a combination thereof.

A device capabilities informing unit 920 is configured to provide information regarding capabilities of communications device 900 to a transmission sending device or an entity configured to select an air interface. A signaling unit 922 is configured to signal the information regarding capabilities of communications device 900. A detecting/decoding unit 924 is configured to detect and decode a transmission intended for communications device 900. A memory 930 is configured to store device capabilities, detected signals, decoded signals, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, transmitter 905 and receiver 910 may be implemented as a specific hardware block, while device capabilities informing unit 920, signaling unit 922, and detecting/decoding unit 924 may be software modules executing in a processor 915, such as a microprocessor, a digital signal processor, a custom circuit, or a custom compiled logic array of a field programmable logic array. Device capabilities informing unit 920, signaling unit 922, and detecting/decoding unit 924 may be modules stored in memory 930.

In an embodiment, a method for adaptively selecting an air interface in a wireless network, the method comprising: defining building blocks of the air interface; defining categories of air interface building blocks; generating candidate solutions for each category of each block; determining a category of each air interface building block based on characteristics of a transmission condition and a transmission content; determining the air interface by selecting a best candidate solution for each air interface building block in accordance with the determined air interface categories; and signaling the determined air interface to a terminal in the wireless network.

In an embodiment, an wireless network management device for adaptively selecting an air interface in a wireless network, the device comprising: a processor; and a computer readable storage medium storing programming for execution by the processor, the programming including instructions to: define building blocks of the air interface; define categories of air interface building blocks; generate candidate solutions for each category of each block; determine a category of each air interface building block based on characteristics of a transmission condition and a transmission content; determine the air interface by selecting a best candidate solution for each air interface building block in accordance with the determined air interface categories; and cause the determined air interface to be signaled to a terminal in the wireless network.

In an embodiment, a method for transmitting, the method comprising: categorizing, by a first device, a transmission between the first device and a second device as one of a plurality of transmission types; selecting, by the first device, an air interface from a plurality of air interface candidates in accordance with the transmission as categorized; and sending, by the first device, the transmission to the second device using the selected air interface.

Optionally, in any of the preceding aspects, another implementation of the aspect provides that the method further includes informing the second device of the selected air interface.

Optionally, in any of the preceding aspects, another implementation of the aspect provides that: wherein the air interface comprises a plurality of building blocks, and wherein informing the second device comprises transmitting indications of options associated with the building blocks of the selected air interface to the second device.

Optionally, in any of the preceding aspects, another implementation of the aspect provides that: wherein the indications are transmitted using a default air interface.

Optionally, in any of the preceding aspects, another implementation of the aspect provides that: wherein the indications are transmitted using a previously selected air interface.

Optionally, in any of the preceding aspects, another implementation of the aspect provides that: wherein the air interface comprises a plurality of building blocks, and wherein the method further comprises preselecting the air interface for each of the transmission types and its corresponding input parameter by selecting an option for each building block of the air interface.

Optionally, in any of the preceding aspects, another implementation of the aspect provides that: wherein the option selected for each building block provides an optimal solution for a corresponding transmission type.

Optionally, in any of the preceding aspects, another implementation of the aspect provides that: wherein the preselected air interface for each of the transmission types are stored in a memory of the first device.

Optionally, in any of the preceding aspects, another implementation of the aspect provides that: further comprising retrieving, from a memory, the air interface for each of the transmission types and its corresponding input parameter by selecting an option for each building block of the air interface.

Optionally, in any of the preceding aspects, another implementation of the aspect provides that: further comprising retrieving, from a first network entity, the air interface for each of the transmission types and its corresponding input parameter by selecting an option for each building block of the air interface.

Optionally, in any of the preceding aspects, another implementation of the aspect provides that: wherein each of the transmission types has an input parameter.

Optionally, in any of the preceding aspects, another implementation of the aspect provides that: wherein the input parameter comprises a transmission content.

Optionally, in any of the preceding aspects, another implementation of the aspect provides that: wherein the input parameter comprises at least one of a transmitting condition at the transmitting device and a receiving condition at the receiving device.

Optionally, in any of the preceding aspects, another implementation of the aspect provides that: wherein the air interface comprises at least one of a waveform building block, a frame structure building block, a multiple access technique building block, a transmission technique building block, a re-transmission technique building block, and a coding and modulating technique building block.

Optionally, in any of the preceding aspects, another implementation of the aspect provides that: wherein the first device comprises one of a communications controller and a transmitting-receiving device.

In an embodiment, the method comprising: receiving, by a receiving device, information about a selected air interface for a transmission from a source device to a destination device, wherein the selected air interface is selected in accordance with input parameters of the transmission; and receiving, by the receiving device, the transmission from the source device using the selected air interface.

Optionally, in any of the preceding aspects, another implementation of the aspect provides that: wherein receiving the transmission comprises detecting and decoding the transmission in accordance with the selected air interface.

Optionally, in any of the preceding aspects, another implementation of the aspect provides that: wherein receiving the information comprises detecting and decoding the information in accordance with a default air interface.

Optionally, in any of the preceding aspects, another implementation of the aspect provides that: wherein receiving the information comprises detecting and decoding the information in accordance with a previously selected air interface.

Optionally, in any of the preceding aspects, another implementation of the aspect provides that: wherein the input parameters comprise receiving condition, and wherein the method further comprises transmitting the receiving condition to the source device.

Optionally, in any of the preceding aspects, another implementation of the aspect provides that: wherein the information is received over a dedicated control channel.

Optionally, in any of the preceding aspects, another implementation of the aspect provides that: wherein the information is received embedded in a control channel not intended for signaling the information.

In an embodiment, a first device comprising: a processor configured to categorize a transmission from the first device to a second device as one of a plurality of transmission types, and to select an air interface from a plurality of air interface candidates in accordance with the transmission as categorized; and a transmitter operatively coupled to the processor, the transmitter configured to send the transmission to the second device using the selected air interface.

Optionally, in any of the preceding aspects, another implementation of the aspect provides that: wherein the processor is configured to inform the second device of the selected air interface.

Optionally, in any of the preceding aspects, another implementation of the aspect provides that: wherein the air interface comprises a plurality of building blocks, and wherein the processor is configured to preselect the air interface for each of the transmission types and its corresponding input parameter by selecting an option for each building block of the air interface.

Optionally, in any of the preceding aspects, another implementation of the aspect provides that: wherein the processor is configured to retrieve, from a memory, the air interface for each of the transmission types and its corresponding input parameter by selecting an option for each building block of the air interface.

Optionally, in any of the preceding aspects, another implementation of the aspect provides that: further comprising a receiver operatively coupled to the processor, the receiver configured to receive, from a first network entity, the air interface for each of the transmission types and its corresponding input parameter by selecting an option for each building block of the air interface.

Optionally, in any of the preceding aspects, another implementation of the aspect provides that: wherein the air interface comprises a plurality of building blocks, and wherein the transmitter is configured to transmit indications of options associated with the building blocks of the selected air interface to the second device.

Optionally, in any of the preceding aspects, another implementation of the aspect provides that: wherein the transmitter is configured to transmit the indications using a default air interface.

Optionally, in any of the preceding aspects, another implementation of the aspect provides that: wherein the transmitter is configured to transmit the indications using a previously selected air interface.

Optionally, in any of the preceding aspects, another implementation of the aspect provides that: wherein the first device comprises one of a communications controller and a transmitting-receiving device.

Optionally, in any of the preceding aspects, another implementation of the aspect provides that: further comprising a receiver operatively coupled to the processor, the receiver configured to receive a receiver condition from the second device.

In an embodiment, a method for transmitting over an air interface is provided. In this embodiment, the method includes obtaining information indicating a second air interface configuration over a first air interface configuration. The first air interface configuration is different from the second air interface configuration. The first air interface configuration and the second air interface configuration each include a combination of two or more building blocks for a waveform, a frame structure, a multiple access technique, a transmission or re-transmission technique, and a coding and modulating technique. Each building block in the first air interface configuration and the second air interface configuration have two or more different configuration options. The method further includes communicating a transmission to or from a second device in accordance with the second air interface configuration. In one example, the first air interface configuration is a default air interface configuration or a previously selected air interface configuration. In any one of the above-mentioned examples, or in yet another example, the combination of two or more building blocks in the first air interface configuration includes a first frame structure and the combination of two or more building blocks in the second air interface configuration includes a second frame structure, where the first frame structure has a different transmission time interval (TTI) length or a different cyclic prefix (CP) length than the second frame structure. In any one of the above-mentioned examples, or in yet another example, the information indicating the second air interface configuration is obtained through explicit signaling or implicit signaling. In any one of the above-mentioned examples, or in yet another example, the information indicating the second air interface configuration is received over a dedicated control channel or is embedded in signaling received over a control channel that is not intended for signaling air interface configuration information. An apparatus for performing this method is also provided.

In yet another embodiment, another method for communicating over an air interface is provided. In this example, the method includes sending information indicating a second air interface configuration over a first air interface configuration. The first air interface configuration is different from the second air interface configuration. The first air interface configuration and the second air interface configuration each include a combination of two or more building blocks for a waveform, a frame structure, a multiple access technique, a transmission or re-transmission technique, and a coding and modulating technique. Each building block in the first air interface configuration and the second air interface configuration has two or more different configuration options. The method further includes communicating a transmission to or from a first device in accordance with the second air interface configuration. In one example, the first air interface configuration is a default air interface configuration or a previously selected air interface configuration. In the same example, or another example, the combination of two or more building blocks in the first air interface configuration includes a first frame structure and the combination of two or more building blocks in the second air interface configuration includes a second frame structure, where the first frame structure has a different transmission time interval (TI) length or a different cyclic prefix (CP) length than the second frame structure. In any one of the above-mentioned examples, or in yet another example, the information indicating the second air interface configuration is obtained through explicit signaling or implicit signaling. In any one of the above-mentioned examples, or in yet another example, the information indicating the second air interface configuration is received over a dedicated control channel or is embedded in signaling received over a control channel that is not intended for signaling air interface configuration information. An apparatus for performing this method is also provided.

In yet another embodiment, yet another method for communicating over an air interface is provided. In this embodiment, the method includes obtaining information indicating a first TI selection of a first air interface configuration. The first air interface configuration is one of a plurality of candidate air interface configurations of the air interface. The plurality of candidate air interface configurations includes a second air interface configuration that is different than the first air interface configuration. The first air interface configuration includes at least the first TI selection and a first transmission technique selection. The second air interface configuration comprises a second TI selection that is different than the first TI selection and a second transmission technique selection that is different than the first transmission technique selection. One of the first transmission technique selection and the second transmission technique selection is a grant free transmission technique. The method further includes communicating a transmission with a second device using the first air interface configuration. In one example, each of the first air interface configuration and the second air interface configuration further comprises at least one of a waveform selection, a multiple access selection, and a modulation or coding selection. In the same example, or in another example, the information indicating the first TI selection is obtained through explicit signaling or implicit signaling. In any one of the above-mentioned examples, or in yet another example, the first transmission technique selection is a grant free transmission technique and the second transmission technique selection is a grant based transmission technique, or the first transmission technique selection is a grant based transmission technique and the second transmission technique selection is a grant free transmission technique. In any one of the above-mentioned examples, or in yet another example, the information indicating the first TI selection is received over a default air interface configuration or a previously selected air interface. An apparatus for performing this method is also provided.

In yet another embodiment, yet another method for communicating over an air interface is provided. In such an embodiment, the method comprises sending information indicating a first TTI selection of a first air interface configuration. The first air interface configuration is one of a plurality of candidate air interface configurations of the air interface. The plurality of candidate air interface configurations comprises a second air interface configuration that is different than the first air interface configuration. The first air interface configuration comprises at least the first TTI selection and a first transmission technique selection. The second air interface configuration comprises a second TTI selection that is different than the first TTI selection and a second transmission technique selection that is different than the first transmission technique selection. One of the first transmission technique selection and the second transmission technique selection is a grant free transmission technique. The method further includes communicating a transmission with a first device using the first air interface configuration. In one example, each of the first air interface configuration and the second air interface configuration further comprises at least one of a waveform selection, a multiple access selection, and a modulation or coding selection. In the same example, or in another example, the information indicating the first TTI selection is obtained through explicit signaling or implicit signaling. In any one of the above-mentioned examples, or in yet another example, the first transmission technique selection is a grant free transmission technique and the second transmission technique selection is a grant based transmission technique, or the first transmission technique selection is a grant based transmission technique and the second transmission technique selection is a grant free transmission technique. In any one of the above-mentioned examples, or in yet another example, the information indicating the first TTI selection is received over a default air interface configuration or a previously selected air interface. An apparatus for performing this method is also provided.

In yet another embodiment, yet another method for communicating over an air interface is provided. In such an embodiment, the method comprises obtaining information indicating a first waveform selection of a first air interface configuration. The first air interface configuration is one of a plurality of candidate air interface configurations of the air interface. The plurality of candidate air interface configurations comprises a second air interface configuration that is different than the first air interface configuration. The first air interface configuration comprises at least the first waveform selection and a first coding selection. The second air interface configuration comprises a second waveform selection that is different than the first waveform selection and a second coding selection that is different than the first coding selection. One of the first waveform selection and the second waveform selection is a non-orthogonal waveform. The method further includes communicating a transmission with a second device using the first air interface configuration. In one example, each of the first air interface configuration and the second air interface configuration further comprises at least one of a frame structure selection, a multiple access selection, and a transmission or re-transmission selection. In the same example, or in another example, the information indicating the first waveform selection is obtained through explicit signaling or implicit signaling. In any one of the above-mentioned examples, or in yet another example, the first waveform selection is an orthogonal waveform and the second waveform selection is a non-orthogonal waveform, or the first waveform selection is a non-orthogonal waveform and the second waveform selection is an orthogonal waveform. In any one of the above-mentioned examples, or in yet another example, the information indicating the first waveform selection is received over a default air interface configuration or a previously selected air interface. An apparatus for performing this method is also provided.

In yet another embodiment, yet another method for communicating over an air interface is provided. In such an embodiment, the method comprises sending information indicating a first waveform selection of a first air interface configuration. The first air interface configuration is one of a plurality of candidate air interface configurations of the air interface. The plurality of candidate air interface configurations comprises a second air interface configuration that is different than the first air interface configuration. The first air interface configuration comprises at least the first waveform selection and a first coding selection. The second air interface configuration comprises a second waveform selection that is different than the first waveform selection and a second coding selection that is different than the first coding selection. One of the first waveform selection and the second waveform selection is a non-orthogonal waveform. The method further includes communicating a transmission with a first device using the first air interface configuration.

In one example, each of the first air interface configuration and the second air interface configuration further comprises at least one of a frame structure selection, a multiple access selection, and a transmission or re-transmission selection. In the same example, or in another example, the information indicating the first waveform selection is obtained through explicit signaling or implicit signaling. In any one of the above-mentioned examples, or in yet another example, the first waveform selection is an orthogonal waveform and the second waveform selection is a non-orthogonal waveform, or the first waveform selection is a non-orthogonal waveform and the second waveform selection is an orthogonal waveform. In any one of the above-mentioned examples, or in yet another example, the information indicating the first waveform selection is received over a default air interface configuration or a previously selected air interface. An apparatus for performing this method is also provided.

In yet another embodiment, yet another method for communicating over an air interface is provided. In such an embodiment, the method includes receiving higher layer signaling indicating a first waveform selection of a first air interface configuration. The first air interface configuration is one of a plurality of candidate air interface configurations of the air interface. The plurality of candidate air interface configurations comprises a second air interface configuration that is different than the first air interface configuration. The first air interface configuration comprises at least the first waveform selection and a first transmission technique selection. The second air interface configuration comprises a second waveform selection that is different than the first waveform selection and a second transmission technique selection that is different than the first transmission technique selection. The method further includes communicating a transmission with a second device using the first air interface configuration. In one example, the first transmission technique selection is a grant free transmission technique and the second transmission technique selection is a grant based transmission technique, or the first transmission technique selection is a grant based transmission technique and the second transmission technique selection is a grant free transmission technique. In the same example, or in another example, the information indicating the first waveform selection is obtained through explicit signaling or implicit signaling. In any one of the above-mentioned examples, or in yet another example, each of the first air interface configuration and the second air interface configuration further comprises at least one of a frame structure selection, a multiple access selection, and a re-transmission selection. In any one of the above-mentioned examples, or in yet another example, the information indicating the first waveform selection is received over a default air interface configuration or a previously selected air interface. An apparatus for performing this method is also provided.

In yet another embodiment, yet another method for communicating over an air interface is provided. In such an embodiment, the method comprises sending higher layer signaling indicating a first waveform selection of a first air interface configuration. The first air interface configuration is one of a plurality of candidate air interface configurations of the air interface. The plurality of candidate air interface configurations comprises a second air interface configuration that is different than the first air interface configuration. The first air interface configuration comprises at least the first waveform selection and a first transmission technique selection. The second air interface configuration comprises a second waveform selection that is different than the first waveform selection and a second transmission technique selection that is different than the first transmission technique selection. The method further includes communicating a transmission with a first device using the first air interface configuration. In one example, the first transmission technique selection is a grant free transmission technique and the second transmission technique selection is a grant based transmission technique, or the first transmission technique selection is a grant based transmission technique and the second transmission technique selection is a grant free transmission technique. In the same example, or in another example, the information indicating the first waveform selection is obtained through explicit signaling or implicit signaling. In any one of the above-mentioned examples, or in yet another example, each of the first air interface configuration and the second air interface configuration further comprises at least one of a frame structure selection, a multiple access selection, and a re-transmission selection. In any one of the above-mentioned examples, or in yet another example, the information indicating the first waveform selection is received over a default air interface configuration or a previously selected air interface. An apparatus for performing this method is also provided.

Figure 10:
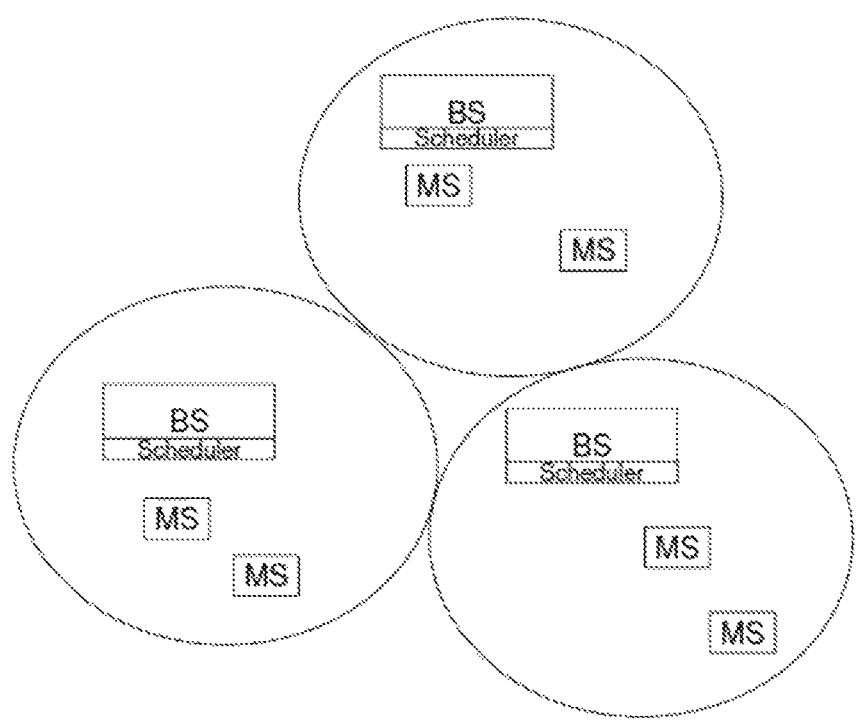
FIG. 10 illustrates an example wireless communications network.

FIG. 10 illustrates a wireless communications network which preferably comprises a plurality of base stations (BS) providing voice and/or data wireless communication service to a plurality of mobile stations (MSs). The BSs, which may also be referred to by other names such as access network (AN), access point (AP), Node-B, etc., preferably downlink (DL) information to the MSs while also receiving uplink (UL) information from the MSs.

Each BS preferably has a corresponding coverage area. These coverage areas represent the range of each BS to adequately transmit data, and, while not necessarily shown, the coverage areas of adjacent BSs preferably have some overlap in order to accommodate handoffs between BSs whenever a MS exits one coverage area and enters an adjacent coverage area. Each BS also preferably includes a scheduler for allocating radio resources to the MSs.

Although the present disclosure and its advantages have been described in detail, it should be understood that various changes, substitutions and alterations can be made herein without departing from the spirit and scope of the disclosure as defined by the appended claims.

What is claimed is:

1. A method comprising:
receiving, by an apparatus, a first signaling indicating a first air interface configuration of a plurality of candidate air interface configurations of a first air interface of at least one air interface, wherein the first signaling comprises a first indicator explicitly identifying a first waveform type, a second indicator indicating a first frame structure type, and a third indicator indicating a first coding and modulating option of the first air interface configuration; and
transmitting, by the apparatus to a transmit point, a transmission using the first air interface configuration, wherein the plurality of candidate air interlace configurations further comprise a second air interlace configuration different from the first air interlace configuration, and the second air interface configuration comprises a second waveform type different from the first waveform type, a second frame structure type different from the first frame structure type, and a second coding and modulating option different from the first coding and modulating option, and
wherein the first air interlace configuration and the second air interlace configuration are used for communicating in an uplink transmission direction of the first air interlace.

2. The method of claim 1, the first air interface configuration further comprising a first transmission technique option, and the second air interlace configuration further comprising a second transmission technique option, wherein the first transmission technique option is a grant free transmission technique and the second transmission technique option is a grant based transmission technique, or wherein the first transmission technique option is the grant based transmission technique and the second transmission technique option is the grant free transmission technique.

3. An apparatus comprising:
a processor; and
a transceiver operatively coupled to the processor, the transceiver configured to:
receive a first signaling indicating a first air interface configuration of a plurality of candidate air interface configurations of a first air interface of at least one air interface, wherein the first signaling comprises a first indicator explicitly identifying a first waveform type, a second indicator indicating a first frame structure type, and a third indicator indicating a first coding and modulating option of the first air interface configuration; and
transmit, to a transmit point, a transmission using the first air interface configuration
wherein the plurality of candidate air interface configurations further comprise a second air interface configuration different from the first air interface configuration, and the second air interface configuration comprises a second waveform type different from the first waveform type, a second frame structure type different from the first frame structure type, and a second coding and modulating option different from the first coding and modulating option, and
wherein the first air interlace configuration and the second air interface configuration are used for communicating in an uplink transmission direction of the first air interface.

4. The apparatus of claim 3, the first air interface configuration further comprising a first transmission technique option, and the second air interlace configuration further comprising a second transmission technique option, wherein the first transmission technique option is a grant free transmission technique and the second transmission technique option is a grant based transmission technique, or wherein the first transmission technique option is the grant based transmission technique and the second transmission technique option is the grant free transmission technique.

5. A method comprising:
sending, by a transmit point, a first signaling indicating a first air interface configuration of a plurality of candidate air interface configurations of a first air interface of at least one air interface, wherein the first signaling comprises a first indicator explicitly identifying a first waveform type, a second indicator a first frame structure type, and a third indicator indicating a first coding and modulating option of the first air interface configuration; and
receiving, by the transmit point from an apparatus, a transmission using the first air interface configuration,
wherein the plurality of candidate air interlace configurations further comprise a second air interlace configuration different from the first air interlace configuration, and the second air interface configuration comprises a second waveform type different from the first waveform type, a second frame structure type different from the first frame structure type, and a second coding and modulating option different from the first coding and modulating option, and
wherein the first air interface configuration and the second air interface configuration are used for communicating in an uplink transmission direction of the first air interface.

6. The method of claim 5, the first air interface configuration further comprising a first transmission technique option, and the second air interface configuration further comprising a second transmission technique option, wherein the first transmission technique option is a grant free transmission technique and the second transmission technique option is a grant based transmission technique, or wherein the first transmission technique option is the grant based transmission technique and the second transmission technique option is the grant free transmission technique.

7. The method of claim 5, wherein the first air interface configuration is transmitted using a default air interface configuration.

8. A transmit point comprising:
a processor; and
a transceiver operatively coupled to the processor, the transceiver configured to:
send a first signaling indicating a first air interface configuration of a plurality of candidate air interface configurations of a first air interface of at least one air interface, wherein the first signaling comprises a first indicator explicitly identifying a first waveform type, a second indicator a first frame structure type, and a third indicator indicating a first coding and modulating option of the first air interface configuration; and
receive, from an apparatus, a transmission using the first air interface configuration,
wherein the plurality of candidate air interlace configurations further comprise a second air interface configuration different from the first air interface configuration, and the second air interlace configuration comprises a second waveform type different from the first waveform type, a second frame structure type different from the first frame structure type, and a second coding and modulating option different from the first coding and modulating option, and
wherein the first air interface configuration and the second air interface configuration are used for communicating in an uplink transmission direction of the first air interface.

9. The transmit point of claim 8, the first air interface configuration further comprising a first transmission technique option, and the second air interface configuration further comprising a second transmission technique option, wherein the first transmission technique option is a grant free transmission technique and the second transmission technique option is a grant based transmission technique, or wherein the first transmission technique option is the grant based transmission technique and the second transmission technique option is the grant free transmission technique.

10. The transmit point of claim 8, wherein the first air interface configuration is transmitted using a default air interface configuration.

11. The method of claim 1, the method further comprising:
receiving, by the apparatus, a second signaling indicating the second air interface configuration of the plurality of candidate air interface configurations of the first air interface, the second signaling comprises indicators for indicating the second waveform type, the second frame structure type, and the second coding and modulating option of the second air interface configuration.

12. The method of claim 1, wherein the first air interface configuration is received using a default air interface configuration.

13. The method of claim 1, the plurality of candidate air interface configurations mapped to indexes.

14. The method of claim 1, further comprising:
receiving, by the apparatus, a third signaling indicating a third air interface configuration of the plurality of candidate air interface configurations of the first air interface, wherein the third signaling comprises indicators for indicating the first waveform type, a third frame structure type different from the first frame structure type, and a third coding and modulating option different from the first coding and modulating option.

15. The apparatus of claim 3, the transceiver further configured to:
receive a second signaling indicating the second air interface configuration of the plurality of candidate air interface configurations of the first air interface, the second signaling comprises indicators for indicating the second waveform type, the second frame structure type, and the second coding and modulating option of the second air interface configuration.

16. The apparatus of claim 3, wherein the first air interface configuration is received using a default air interface configuration.

17. The apparatus of claim 3, the plurality of candidate air interface configurations mapped to indexes.

18. The apparatus of claim 3, the transceiver further configured to:
receive a third signaling indicating a third air interface configuration of the plurality of candidate air interface configurations of the first air interface, wherein the third signaling comprises indicators for indicating the first waveform type, a third frame structure type different from the first frame structure type, and a third coding and modulating option different from the first coding and modulating option.

19. The method of claim 5, the method further comprising:
sending, by the transmit point, a second signaling indicating the second air interface configuration of the plurality of candidate air interface configurations of the first air interface, the second signaling comprises indicators for indicating the second waveform type, the second frame structure type, and the second coding and modulating option of the second air interlace configuration.

20. The method of claim 5, the plurality of candidate air interface configurations mapped to indexes.

21. The method of claim 5, further comprising:
sending, by the transmit point, a third signaling indicating a third air interface configuration of the plurality of candidate air interface configurations of the first air interface, wherein the third signaling comprises indicators for indicating the first waveform type, a third frame structure type different from the first frame structure type, and a third coding and modulating option different from the first coding and modulating option.

22. The transmit point of claim 8, the transceiver further configured to:
send a second signaling indicating the second air interface configuration of the plurality of candidate air interface configurations of the first air interface, the second signaling comprises indicators for indicating the second waveform type, the second frame structure type, and the second coding and modulating option of the second air interface configuration.

23. The transmit point of claim 8, the plurality of candidate air interface configurations mapped to indexes.

24. The transmit point of claim 8, the transceiver further configured to:
send a third signaling indicating a third air interface configuration of the plurality of candidate air interface configurations of the first air interface, wherein the third signaling comprises indicators for indicating the first waveform type, a third frame structure type different from the first frame structure type, and a third coding and modulating option different from the first coding and modulating option.

25. A network system comprising:
a component in a backhaul network communicating data with a transmit point; and
the transmit point, the transmit point configured to:
send a first signaling indicating a first air interlace configuration of a plurality of candidate air interface configurations of a first air interface of at least one air interface, wherein the first signaling comprises a first indicator explicitly identifying a first waveform type, a second indicator a first frame structure type, and a third indicator indicating a first coding and modulating option of the first air interface configuration; and
receive, from an apparatus, a transmission using the first air interface configuration,
wherein the plurality of candidate air interface configurations further comprise a second air interface configuration different from the first air interface configuration, and the second air interlace configuration comprises a second waveform type different from the first waveform type, a second frame structure type different from the first frame structure type, and a second coding and modulating option different from the first coding and modulating option, and
wherein the first air interface configuration and the second air interface configuration are used for communicating in an uplink transmission direction of the first air interface.

26. The network system of claim 25, the first air interface configuration further comprising a first transmission technique option, and the second air interface configuration further comprising a second transmission technique option, wherein the first transmission technique option is a grant free transmission technique and the second transmission technique option is a grant based transmission technique, or wherein the first transmission technique option is the grant based transmission technique and the second transmission technique option is the grant free transmission technique.

27. The network system of claim 25, wherein the first air interface configuration is transmitted using a default air interlace configuration.

28. The network system of claim 25, the transmit point further configured to:
send a second signaling indicating the second air interlace configuration of the plurality of candidate air interface configurations of the first air interface, the second signaling comprises indicators for indicating the second waveform type, the second frame structure type, and the second coding and modulating option of the second air interlace configuration.

29. The network system of claim 25, the plurality of candidate air interlace configurations mapped to indexes.

30. The network system of claim 25, the transmit point further configured to:
send a third signaling indicating a third air interface configuration of the plurality of candidate air interlace configurations of the first air interlace, wherein the third signaling comprises indicators for indicating the first waveform type, a third frame structure type different from the first frame structure type, and a third coding and modulating option different from the first coding and modulating option.

* * * * *

UNITED STATES PATENT AND TRADEMARK OFFICE
CERTIFICATE OF CORRECTION

PATENT NO. : 10,721,681 B2  
APPLICATION NO. : 16/055941  
DATED : July 21, 2020  
INVENTOR(S) : Jianglei Ma et al.

Page 1 of 1

It is certified that error appears in the above-identified patent and that said Letters Patent is hereby corrected as shown below:

In the Claims

In Column 24, Line 6, Claim 1, delete "interlace" and insert --interface--.
In Column 24, Line 7, Claim 1, delete "interlace" and insert --interface--.
In Column 24, Line 8, Claim 1, delete "interlace" and insert --interface--.
In Column 24, Line 15, Claim 1, delete "interlace" and insert --interface--.
In Column 24, Line 16, Claim 1, delete "interlace" and insert --interface--.
In Column 24, Line 18, Claim 1, delete "interlace" and insert --interface--.
In Column 24, Line 21, Claim 2, delete "interlace" and insert --interface--.
In Column 24, Line 54, Claim 3, delete "interlace" and insert --interface--.
In Column 24, Line 60, Claim 4, delete "interlace" and insert --interface--.
In Column 25, Line 13, Claim 5, delete "interlace" and insert --interface--.
In Column 25, Line 14, Claim 5, delete "interlace" and insert --interface--.
In Column 25, Line 15, Claim 5, delete "interlace" and insert --interface--.
In Column 25, Line 55, Claim 8, delete "interlace" and insert --interface--.
In Column 25, Line 58, Claim 8, delete "interlace" and insert --interface--.
In Column 27, Line 3, Claim 19, delete "interlace" and insert --interface--.
In Column 27, Line 42, Claim 25, delete "interlace" and insert --interface--.
In Column 28, Line 6, Claim 25, delete "interlace" and insert --interface--.
In Column 28, Line 28, Claim 27, delete "interlace" and insert --interface--.
In Column 28, Line 31, Claim 28, delete "interlace" and insert --interface--.
In Column 28, Line 37, Claim 28, delete "interlace" and insert --interface--.
In Column 28, Line 39, Claim 29, delete "interlace" and insert --interface--.
In Column 28, Line 43, Claim 30, delete "interlace" and insert --interface--.
In Column 28, Line 44, Claim 30, delete "interlace" and insert --interface--.

Signed and Sealed this
Sixth Day of October, 2020

Andrei Iancu
*Director of the United States Patent and Trademark Office*